(12) United States Patent
Abreu et al.

(10) Patent No.: US 6,549,617 B1
(45) Date of Patent: Apr. 15, 2003

(54) TELEPHONE SWITCH WITH DELAYED MAIL CONTROL SYSTEM

(75) Inventors: Enrique J. Abreu, Stamford, CT (US); Gary V. Pieper, Wallingford, CT (US); Neville Colin Mair, Milford, CT (US)

(73) Assignee: International Controllers, Inc., Stamford, CT (US)

( * ) Notice: Subject to any disclaimer, the term of this patent is extended or adjusted under 35 U.S.C. 154(b) by 0 days.

(21) Appl. No.: 09/487,920

(22) Filed: Jan. 19, 2000

(51) Int. Cl.7 .............................................. H04M 11/00
(52) U.S. Cl. ................................ 379/93.24; 379/265.09
(58) Field of Search ........................... 379/93.01, 93.24, 379/265.09; 709/104, 105, 206

(56) References Cited

U.S. PATENT DOCUMENTS

| | | | |
|---|---|---|---|
| 3,688,047 A | 8/1972 | Morris | 348/14.11 |
| 3,829,617 A | 8/1974 | Caithamer et al. | 379/111 |
| 5,181,237 A | 1/1993 | Dowden et al. | 379/88.03 |
| 5,251,255 A | 10/1993 | Epley | 379/242 |
| 5,311,572 A | 5/1994 | Friedes et al. | 379/211.02 |
| 5,333,184 A | 7/1994 | Doherty et al. | 379/115.01 |
| 5,771,282 A | 6/1998 | Friedes | 379/121.03 |
| 5,835,580 A | 11/1998 | Fraser | 379/115.01 |
| 5,923,749 A | 7/1999 | Gustafsson et al. | 379/406.06 |
| H1802 H | 9/1999 | Erwin et al. | 379/243 |
| 6,263,066 B1 * | 7/2001 | Shtivelman et al. | 379/210.01 |
| 6,374,291 B1 * | 4/2002 | Ishibashi et al. | 358/400 |

* cited by examiner

Primary Examiner—Ahmad F. Matar
Assistant Examiner—Quynh Nguyen
(74) Attorney, Agent, or Firm—DeLio & Peterson, LLC

(57) ABSTRACT

A telephone switch in which communication between tasks controlling the switch hardware and the timing of those tasks, including the timing of repeating tasks, is controlled through a mail system in which mail messages are sent between tasks that may be running on separate microprocessors. The mail messages specify the destination task, the function that the task is to perform and any desired delay before the mail is to be delivered to the destination task. Repeating tasks send mail to themselves each time they repeat, specifying in the mail message the task to be repeated and the desired delay interval. A mail task holds the mail for the specified delay interval before it is delivered, and receipt of a mail message causes the task to run.

19 Claims, 9 Drawing Sheets

TELEPHONE SWITCH WITH DELAYED MAIL CONTROL SYSTEM

BACKGROUND OF THE INVENTION

1. Field of the Invention

The present invention relates to digital telephone switches used to connect a calling telephone to a destination telephone through a public switched telephone network. More specifically, the present invention relates to digital telephone switches having a digital control system where software application tasks running on one or more microprocessors control the telephone switch hardware in real time.

2. Description of Related Art

Telephone switches are used to simultaneously handle multiple telephone signals by connecting originating telephones to destination telephones through the public switched telephone network (PSTN). Switches of this type must perform a variety of tasks, such as detecting incoming calls, providing voice prompts to callers, identifying the phone number dialed, selecting an available outgoing line, dialing the destination phone number, monitoring the switch hardware for error conditions, etc. The switch may also provide functions such as call echo reduction, filtering and signal compression.

Modern phone switches are digital, and receive incoming digital telephone phone signals in the form of digitized voice data with digital control data. A microprocessor within the telephone switch runs application tasks, in the form of computer programs, which handle the many jobs that must be completed in real time in order to keep and maintain the multiple telephone connections.

Many of the tasks to be accomplished by a digital telephone switch of this type need to repeated on a regular basis. For example, each incoming line to the telephone switch must be checked regularly to determine if there is any activity, such as an incoming call, a disconnect or an error condition. In some cases these repetitive tasks must be completed many times each second whenever the switch is operating. Other tasks may need to be completed after tens or hundreds of seconds have elapsed, or even longer. The tasks may have to be completed only a few times, or only subsequent to, or prior to, the completion of some other task. The timing for all of these tasks as well as the necessary communication between tasks must be handled by the programming that is part of the switch control system.

The prior art has generally handled the two issues of 1) timing of task operation, and 2) communication between tasks as two separate issues that are handled in different ways. Timing of regularly repeating tasks has heretofore been accomplished through the control system software programming using a plurality of timers set by the software. Upon completing the repetitive task, the timer is reset by the software. Upon expiration of the timer, the repetitive task runs again. In order to handle the numerous timing tasks that are needed, however, this technique results in a multitude of simultaneous timers that need to be managed.

At the same time, the control system needs to send control information back and forth between different portions of the control system program. For example, the portion of the control program monitoring the incoming phone lines needs to advise another portion of the control program that controls switching to redirect the incoming call to an outgoing line at the appropriate time.

In many cases this control information does not need to be acted upon immediately, but must be completed after a delay period. Conventional programming and control techniques provide for such a delay by setting another timer. The expiration of that timer causes the control information to be acted upon. Accordingly, timers may be set for a portion of the control program to complete its own operation on a repetitive basis or for another portion of the control program to initiate action according to some control information.

This plurality of timers results in control programs which are difficult to write and modify, and which are not easily expandable to multiple processor designs and to distributed computing environments.

Bearing in mind the problems and deficiencies of the prior art, it is therefore an object of the present invention to provide a telephone switch with a simplified control system that is easy to write and modify.

Another object of the present invention is to provide a telephone switch with a control system that is easily distributed among multiple processors.

A further object of the present invention is to provide a telephone switch with a control system in which the timing of repetitive tasks or delayed tasks is combined with the passing of control information.

SUMMARY OF THE INVENTION

The above and other objects, which will be apparent to those skilled in the art, are achieved in the present invention which is directed to a telephone switch having a simplified control system that integrates timing functions with the passing of control information. Telephone switch control is achieved by placing the control information that must be sent between tasks into mail messages and then controlling the delivery of such mail by specifying a delay period for delivery of the mail message, where desired. To repeat a function on a regular basis, a repeating task simply sends a mail message back to itself specifying the desired delay. A delayed mail message contains a destination task, which may be itself, control information which may be a function that is repeated on a regular basis, and a specified delay period. The delayed mail message is sent to a mail task, which holds this message until the desired time, then sends it to the destination task.

More specifically, the invention includes a telephone switch having at least one microprocessor adapted for running programming tasks and a mail task running at sequentially spaced time intervals on the at least one microprocessor. The mail task includes an incoming mail queue for receiving mail messages to be held by the mail task for a delay time specified in each mail message it receives. The mail task also includes an internal delayed mail queue for holding received mail messages for the specified delay time. A mail receiving subtask removes messages from the incoming mail queue and places them in the internal delayed mail queue and a mail sending subtask removes delayed mail messages from the internal delayed mail queue after the specified delay time, then sends each delayed mail message to a destination application task specified in the mail message.

The control system also includes a plurality of application tasks for controlling the operation of the telephone switch. Each application task also has an incoming mail queue for receiving mail messages directed to control the application task, a mail receiving subtask for removing mail messages from the incoming mail queue and acting upon control information specified in each mail message, and a mail sending subtask for sending mail messages to the incoming mail queue of the mail task. Each mail message sent to the mail task specifies a destination application task and includes control information and a specified delay time.

The invention also includes the method of controlling the telephone switch of the invention. The method includes the steps of running the mail task on the telephone switch, holding received mail messages in an internal delayed mail queue for a delay time specified in each mail message and running a plurality of application tasks to control the telephone switch. The method further includes the steps of sending delayed mail messages from application tasks to the mail task, the delayed mail messages specifying a destination application task, a delay time and control information to control the destination application task, and sending each delayed mail message from the mail task to the corresponding destination application task after the specified delay time for each delayed mail message has elapsed.

In the most highly preferred embodiment of the invention, the mail task runs repetitively, once for each time a countdown timer controlled by the operating system completes a countdown. The operating system resets and restarts the timer each time the countdown completes and the duration of the timer is sufficiently short to ensure that the mail task will run at least as often as the shortest desired delay time specified in a mail message. The mail task converts the specified delay time of each delayed mail message into a tic count by dividing the period of the countdown timer into the specified delay time, then decrements the tic count for each message once each time the mail task runs.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
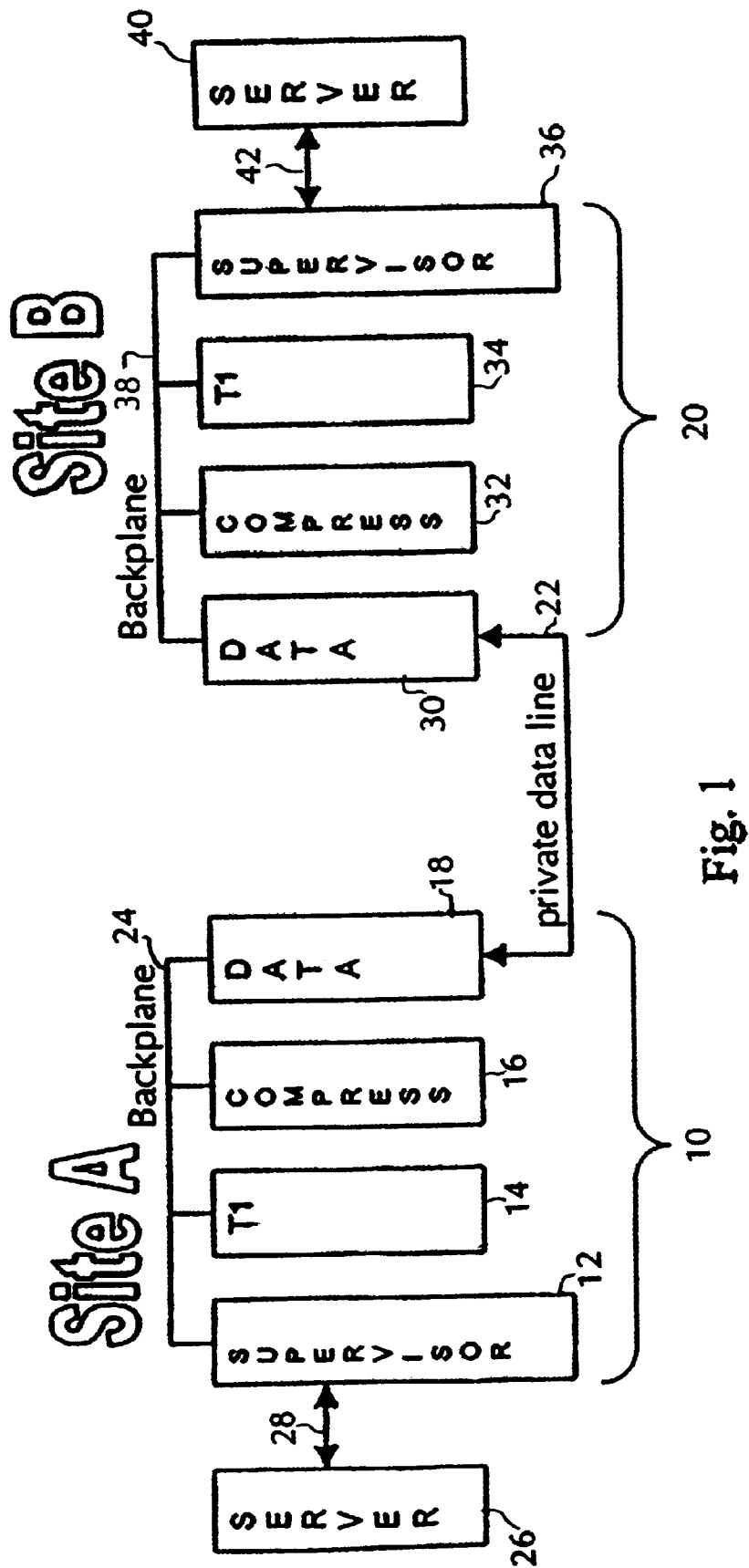
FIG. 1 is a block diagram of two telephone switches according to the present invention located at two different geographic sites and connected via a private data line. The two switches are illustrated in hardware block diagram form with different hardware circuit cards interconnected through a backplane and a server computer associated with each telephone switch.

In describing the preferred embodiment of the present invention, reference will be made herein to FIGS. 1–10 of the drawings in which like numerals refer to like features of the invention. Features of the invention are not necessarily shown to scale in the drawings.

FIG. 1 shows a telephone switching system incorporating a first telephone switch 10 constructed according to the present invention and located at site A. Switch 10 is connected to a second telephone switch 20 located at site B. The first telephone switch 10 is connected to the second telephone switch 20 via a private data line 22. The private data line allows phone signals to be carried between the two switches.

The first switch 10 includes four plug-in circuit cards 12, 14, 16 and 18 interconnected through backplane 24. The backplane provides power and multiple high speed duplex serial communication connections that allow the cards to communicate with each other.

A server 26, which is preferably a personal computer, is connected to supervisor card 12 via serial connection 28. The supervisor card controls the remaining circuit cards connected to the backplane, which include T1 card 14, compression card 16 and data card 18. The data card 18 is connected to private data line 22. The telephone switching system at site B is substantially identical, and includes data card 30, compression card 32, T1 card 34 and supervisor card 36, all of which are interconnected through backplane 38. Server 40 is connected to the second telephone switch 20 through serial connection 42.

Figure 3:
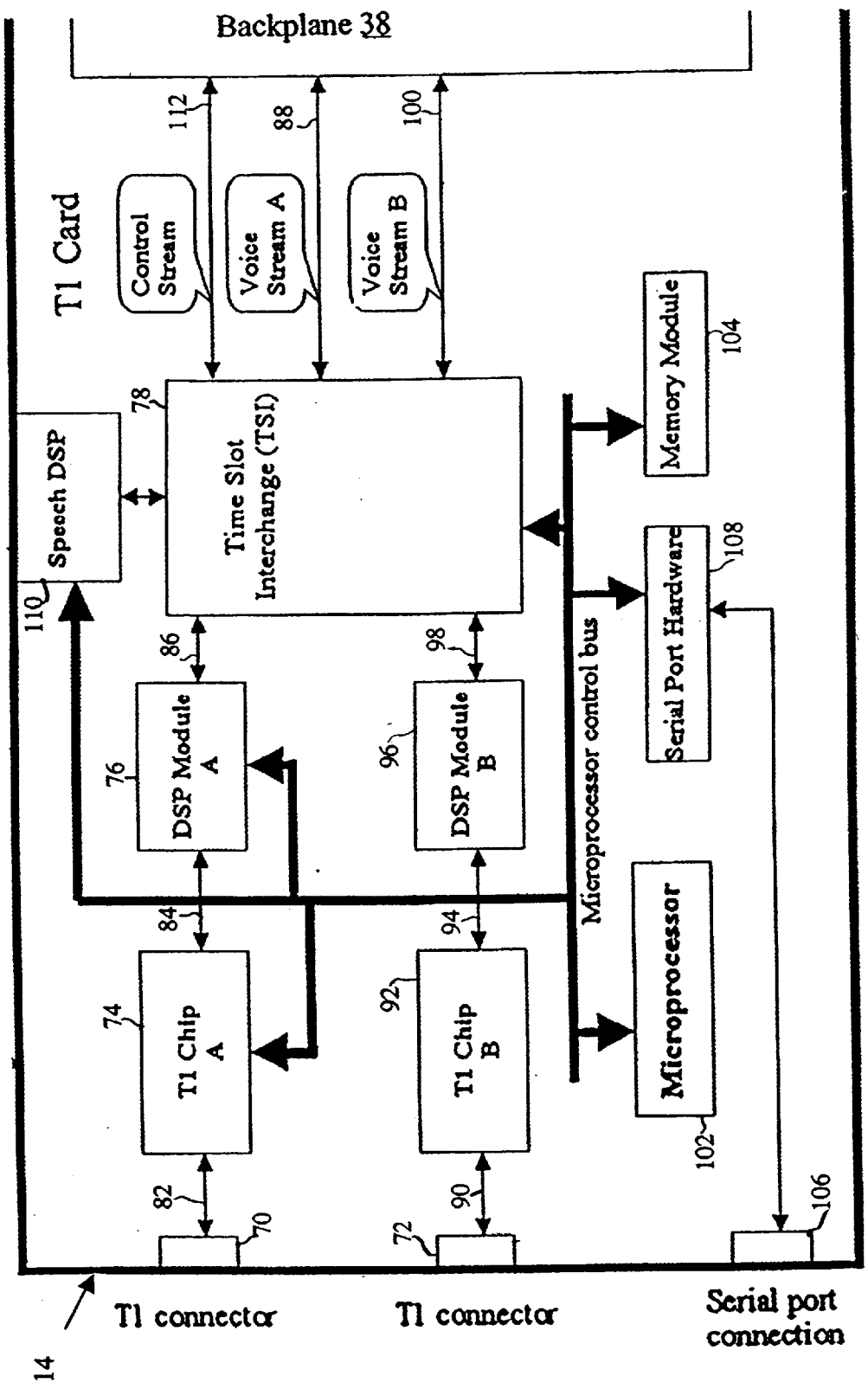
FIG. 3 is a hardware block diagram showing the T1 circuit card seen in FIG. 1.

As is shown in the more detailed view of FIG. 3, each T1 card is connected to a pair of T1 digital phone lines and each of the T1 lines carries multiple digital telephone channels in the manner that is well known to the art. The T1 digital phone lines are connected to the public switched telephone network so that incoming calls may be received by the switches 10, 20 and outgoing calls may be placed by the switches. Each telephone switch may also include additional T1 cards to increase the switching system capacity.

The backplanes in the switches include multiple duplex serial communication connections (stream buses) carrying digital data at high speed (digital data streams). The digital data streams are all organized identically into 32 separate channels, but are of two basic types. One type carries voice data on the channels. There are multiple voice data streams on the backplanes. The other type is a control stream carrying control signals between the cards, with each channel in the control stream corresponding to a particular circuit card connected to the backplane.

Communication between the cards is achieved through the use of mail messages which carry control information to specified tasks on the microprocessors. Timing of the operation of tasks is achieved by sending mail messages with an appropriate delay.

The server 26 is preferably a personal computer and includes a relatively low speed serial connection 28 to the supervisor card 12. The server allows an operator to manage the operation of the switch through a conventional computer screen and keyboard. It also maintains a database of users and other billing and control information that only needs to be accessed at a relatively slow speed compared to the high speed real time control system needed to operate the switch through the serial data streams of the backplane.

Because the telephone switches 10, 20 are substantially identical, only the first telephone switch 10 will be described in detail. Each circuit card in the switch has a similar basic organization which includes a microprocessor on each card that runs tasks to control hardware appropriate to the function of the card. In the preferred implementation of this system, each card has its own microprocessor which runs tasks appropriate to the card. Other organizations of the delayed mail control system of this invention may be implemented, however, in which a single. microprocessor is used to run all tasks.

Figure 2:
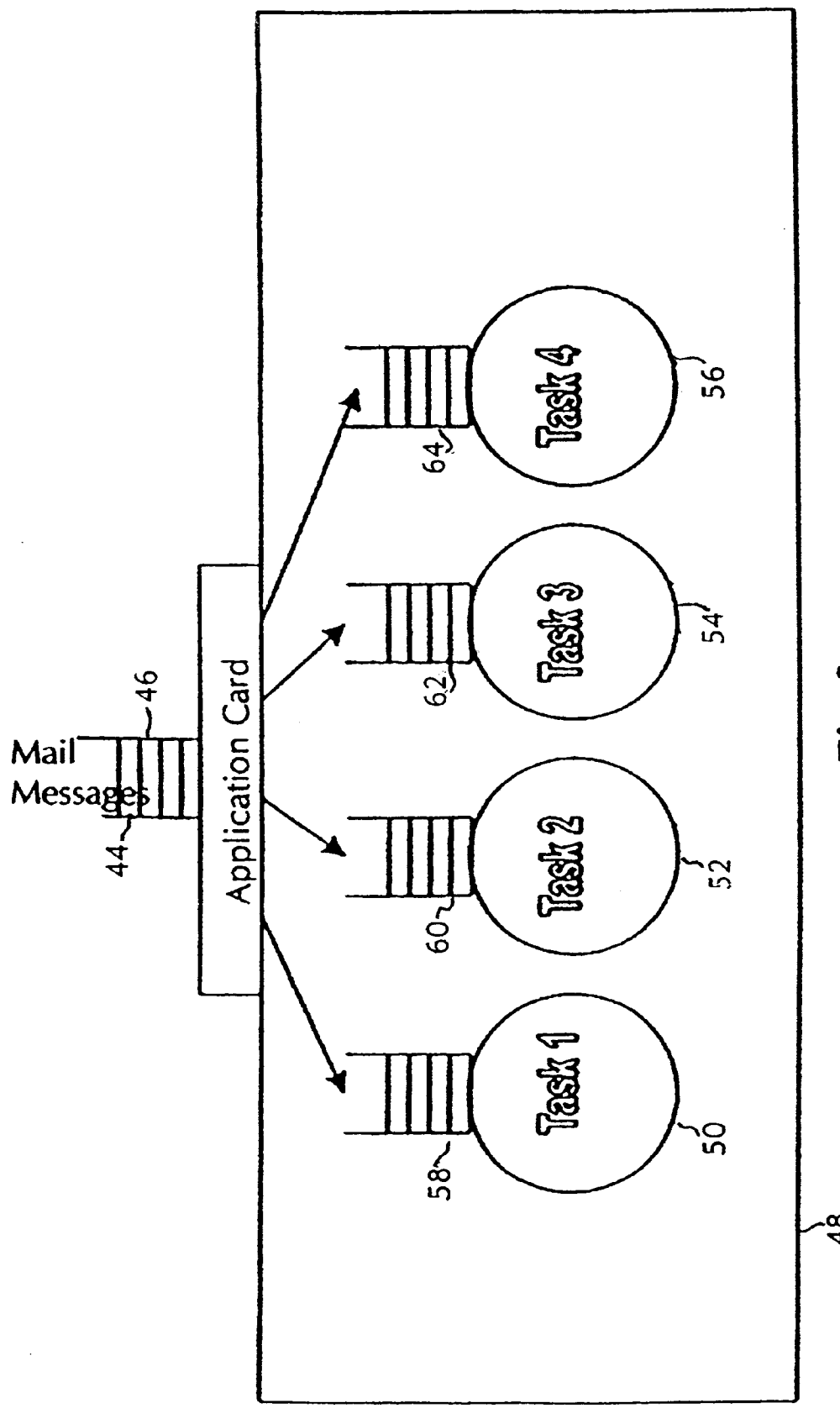
FIG. 2 is a generic software block diagram of a single circuit card of the type illustrated in FIG. 1 showing how incoming mail messages arrive at a designated circuit card through the backplane and are distributed to the incoming mail queues of application tasks running on a microprocessor on each circuit card.

FIG. 2 shows the software organization of a single circuit card constructed according to the preferred design. The software organization is shown in a generic manner and illustrates how mail messages 44, 46 arrive at a circuit card 48 (which may correspond to any of the circuit cards 12, 14, 16, 18, 30, 32, 34 and 36) via the backplane 24. The mail messages are distributed to various software tasks 50, 52, 54, 56. The tasks are running on the microprocessor located on the circuit card.

It should be understood that the circuit cards are different in that they include different hardware components, and different application tasks stored in the memory of the card, but the software organization is essentially similar, as illustrated in FIG. 2. Each circuit card includes its own microprocessor as described in connection with FIGS. 3 and 4. The software tasks 50, 52, 54, 56 each include a corresponding incoming mail queue 58, 60, 62, and 64 which receive the mail messages 44, 46.

Figure 6:
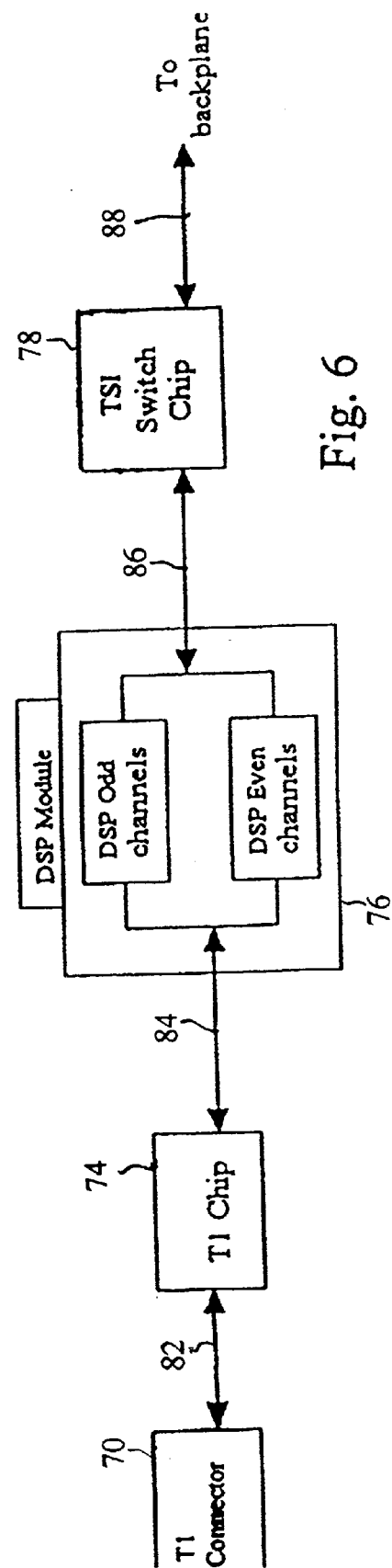
FIG. 6 is a hardware block diagram showing the digital signal processor (DSP) modules found on the T1 card of FIG. 3 and the interconnection between the DSP modules and other components on the T1 card though the use of stream buses carrying digital data in streams of the type illustrated in FIG. 5.

FIG. 3 provides a block diagram of the T1 circuit card 14 seen in FIG. 1. The T1 circuit card 14 includes two T1 connectors 70, 72. Each T1 connector is connected to a standard T1 telephone line making a digital connection to the public switch telephone network. Each T1 line has 32 duplex channels, only 24 of which are in use in a standard T1 line. Each channel carries 64 Kb/s of digital data. The digital data from T1 connector 70 passes through T1 chip 74, through DSP module 76 and into the time slot interchange (TSI) module 78. FIG. 6 shows this flow in greater detail.

Figure 5:
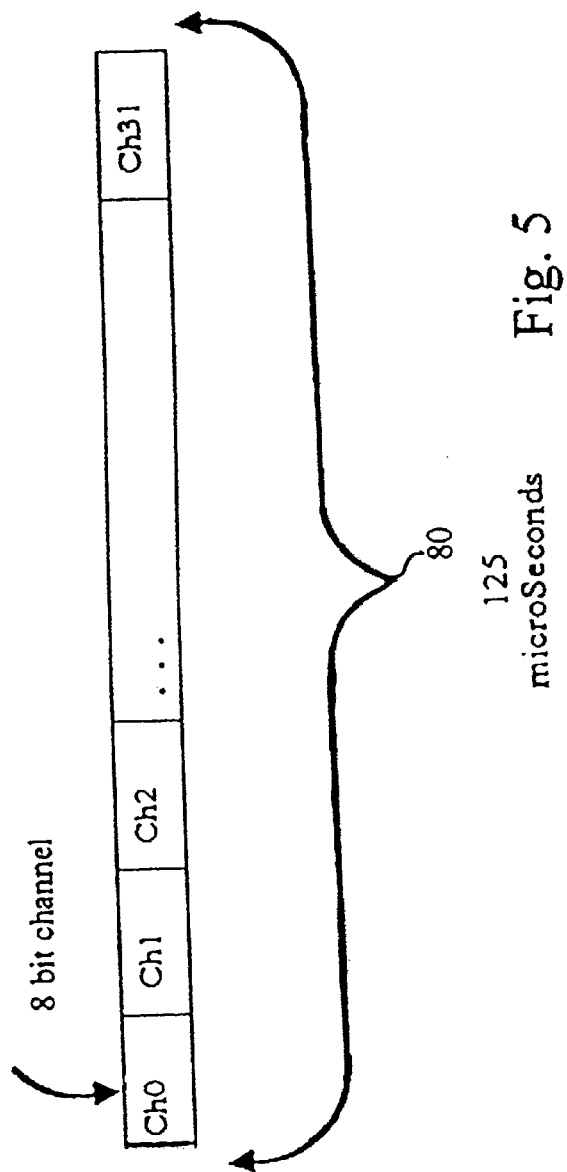
FIG. 5 illustrates one half of a duplex digital data stream used in the present invention to carry voice and control signals. A 125 microsecond sample is shown which is organized into 32 channels with 32 eight bit data samples being sent repetitively every 125 microseconds to form a 2.048 Mb/s serial data stream. The corresponding other half of the duplex stream is organized identically and is not shown.

FIG. 5 describes the organization of the channels into a digital data steam. A digital data stream comprises two serial links, an up link and a down link providing duplex operation. Each serial link transmits digital data at a rate of 2.048 Mb/s in each direction, and each data stream is organized into 32 duplex channels, each of which carries digital data at a rate of 64 Kb/s. Every 125 microseconds, 8 bits of each channel is transmitted.

FIG. 5 shows a 125 microsecond period 80 in which 8 bits of data for each of 32 channels is sent once, providing 256 bits of data in one second, i.e., 2.048 Mb/s. The first 8 bits correspond to channel 0 (marked Ch0), the next 8 bits correspond to channel 1 (marked Ch1), etc. until the last 8 bits are transmitted at the end of the 125 microsecond period. The sequence of 32 channels then repeats with new 8 bit samples for each channel. Every 125 microseconds, each channel repeats providing the 64 Kb/s data rate for each channel and the 2.048 Mb/s data rate for each direction of the complete digital data stream.

A standard T1 signal on T1 connector 70 is organized as the above described digital data stream, except that the convention for T1 signals is that every fourth channel is not used, resulting in a total of only 24 channels being used on the T1 line. The T1 connector 70 seen in FIGS. 3 and 6 transmits the 24 phone signals via a duplex digital data stream over stream bus 82 to T1 chip 74. The data then passes to DSP module 76 via stream bus 84.

As can be seen in FIG. 6, the DSP module 76 is organized into a pair of DSPs which separately process the odd and even channels in the stream coming from T1 connector 70. This separation is done due to the speed limitations of available DSPs. The signal then passes into TSI switch chip 78 over stream bus 86.

The principal function of the TSI switch chip 78 is to take any one of the 32 channels in a digital data stream and move it to any other channel. Thus, the time slot interchange chip interchanges the 8 bits of data found in the 125 microsecond period of FIG. 5 with the 8 bits on any other channel. In the present invention, the TSI switch chip 78 on a T1 card packs the 24 channels from the standard T1 arrangement (where every fourth channel is unused) into the first 24 channels of the 32 available channels. From TSI chip 78, the digital data flows out of stream bus 88 to the backplane 38.

Duplex digital data flows in the identical manner from T1 connector 72 through stream bus 90 into T1 chip 92 through stream bus 94 to DSP module 96, and then through stream bus 98 and into TSI chip 78, and ultimately out voice stream bus 100 to the backplane 38. The packing of the 24 channels from the T1 connector onto the first 24 channels of the digital data stream is performed on both digital data streams arriving on stream buses 86 and 98.

The operation of the T1 card is controlled by microprocessor 102 which has programming tasks stored in memory module 104. The programming tasks are appropriate for the hardware located on the T1 card. A serial port connection 106 provides external control of the microprocessor and allows application tasks to be changed and uploaded through serial port hardware 108. DSP modules 76 and 96 provide various functions including the generation of tones for dialing, tone detection and gain adjustment. Speech DSP module 110 generates voice prompts.

Microprocessor 102 runs tasks, such as tasks 50, 52, 54 and 56 in FIG. 2, which control the operation of the hardware on T1 card 14. Control information included in mail messages is sent to and from the cards via a control stream which travels over stream bus 112.

Figure 4:
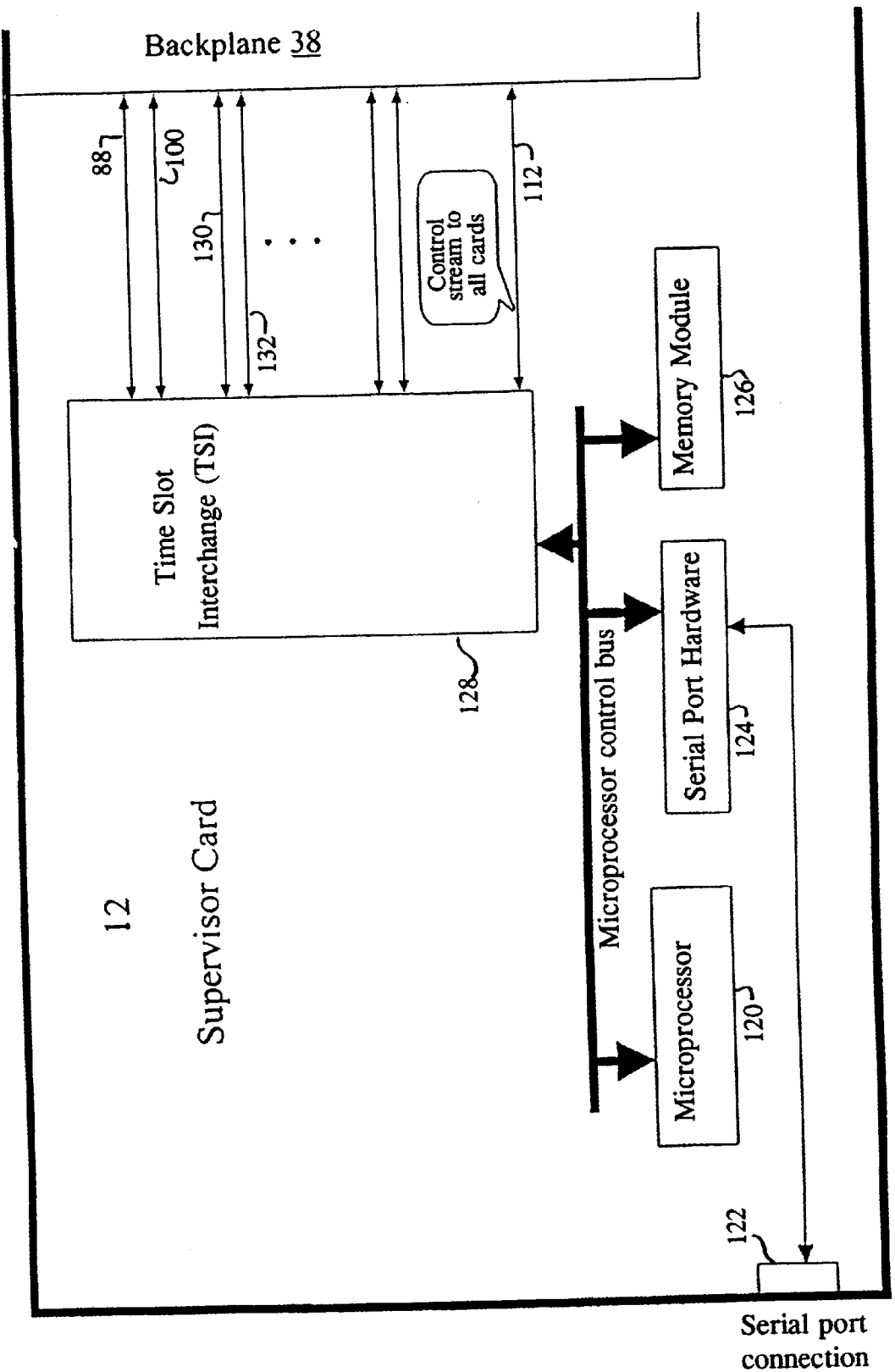
FIG. 4 is a hardware block diagram showing the supervisor card seen in FIG. 1.

FIG. 4 shows the supervisor card 12. The supervisor card 12 includes a microprocessor 120, a serial port connection 122, a serial port hardware 124, memory module 126 and a TSI switch chip 128, all of which operate in essentially the same manner described in connection with the T1 card 14 of FIG. 3. The supervisor card receives voice streams A and B from the T1 card 14 over stream buses 88 and 100 through the connection to the backplane 38. The TSI chip 128 on supervisor card 12 is where the switching of telephone calls is accomplished in the telephone switch of this invention.

More specifically, the TSI chip 128 on supervisor card 12 is connected via the backplane and via pairs of stream buses (e.g., stream buses 88, 100) to all of the T1 cards in the switch of the present invention. For local calls, i.e., calls that do not need to travel over the private data line 22 of FIG. 1, an incoming call on a channel of the T1 connector 70 could be connected to an outgoing line on a different channel found on the digital data stream going to the same connector 70.

In such a case, the microprocessor 102 on the T1 card will identify the arriving call using an application task that repetitively checks the status of all the lines. The microprocessor 102 provide the user with voice prompts (according to another task on the microprocessor) asking the caller to enter identifying information, dial the desired phone number etc.

Speech prompts will be generated using speech DSP 110. Ultimately the control system will identify an available outgoing channel on T1 connector 70. It should be understood that the switch may use any desired available channel, and such channels may be found on T1 connector 72 or on other T1 cards attached to the backplane.

The digitized voice data from the incoming call will travel through T1 chip 74 and out voice stream A on stream bus 88 to the supervisor card 12 via the backplane and the continuation of stream bus 88 in FIG. 4. The microprocessor 120 on the supervisor card will instruct TSI chip 128 to redirect the incoming digitized voice data onto a different channel corresponding to the available outgoing channel on stream bus 88 which then passes back to T1 card 14 through the TSI chip 78 and ultimately out T1 connector 70.

During the phone conversation, digitized data from one channel at the incoming T1 connector 70 passes from T1 card 14 to the supervisor card 12 and then back on a different channel and ultimately out the same connector on a different channel to the public switch telephone network (PSTN). Alternatively, all of the available channels on T1 connector 70 may be filled, and there may be available channels on T1 connector 72. In this case, data will be moved by the TSI chip 128 from a channel on stream bus 88 to an available channel on stream bus 100 and from there through TSI chip 78 on T1 card 14 and ultimately out to T1 connector 72. Stream buses 88 and 100 are dedicated to T1 card 14 through backplane 38. Additional T1 cards have additional dedicated streams, for example stream bus 130 and 132 may be dedicated to an additional T1 card which is otherwise substantially identical to T1 card 14 illustrated in FIG. 3.

The control bus 112 is used to carry control information in the form of mail to each of the circuit cards attached to the backplane. The 32 channels on the control stream carried on stream bus 112 are dedicated to the various cards connected to the backplane. This allows each card to receive messages from every other card by watching its dedicated channel and to send messages to every other card by placing the appropriate digital data in the corresponding channel for the recipient card.

FIG. 1 shows two additional types of cards namely compression card 16 and data card 18. Data card 18 is used to transmit multiple phone calls simultaneously over a private data line 22 from the first switch 10 to another switch 20. The data cards 18 and 30 are substantially identical to the T1 card 14 described previously except that outgoing data is directed onto the private data line 22 instead of onto a T1 line connected to the PSTN.

The data card is normally used for long distance calls where it is desirable to maximize the number of calls that can be carried over the private data line 22. To further improve the call carrying capacity over private data line 22, circuit card 16 is dedicated to the task of compressing the digital voice data using a conventional digital data compression algorithm prior to sending the data through data card 10 to the destination telephone switch.

The compression card 16 and data card 18 each includes a microprocessor and associated hardware as described in connection with the T1 card 14 and supervisor card 12. Each microprocessor runs application tasks appropriate to the hardware and function to be controlled on its particular card, and each receives control signals from other cards and from the supervisor card over the control stream bus 112 which is common to all cards. Thus, each card is organized in the manner described in FIG. 2 with software tasks running on the microprocessor and receiving control information though control stream bus 112 in the form of mail messages addressed to various tasks running on the microprocessor located on the destination card.

Figure 7:
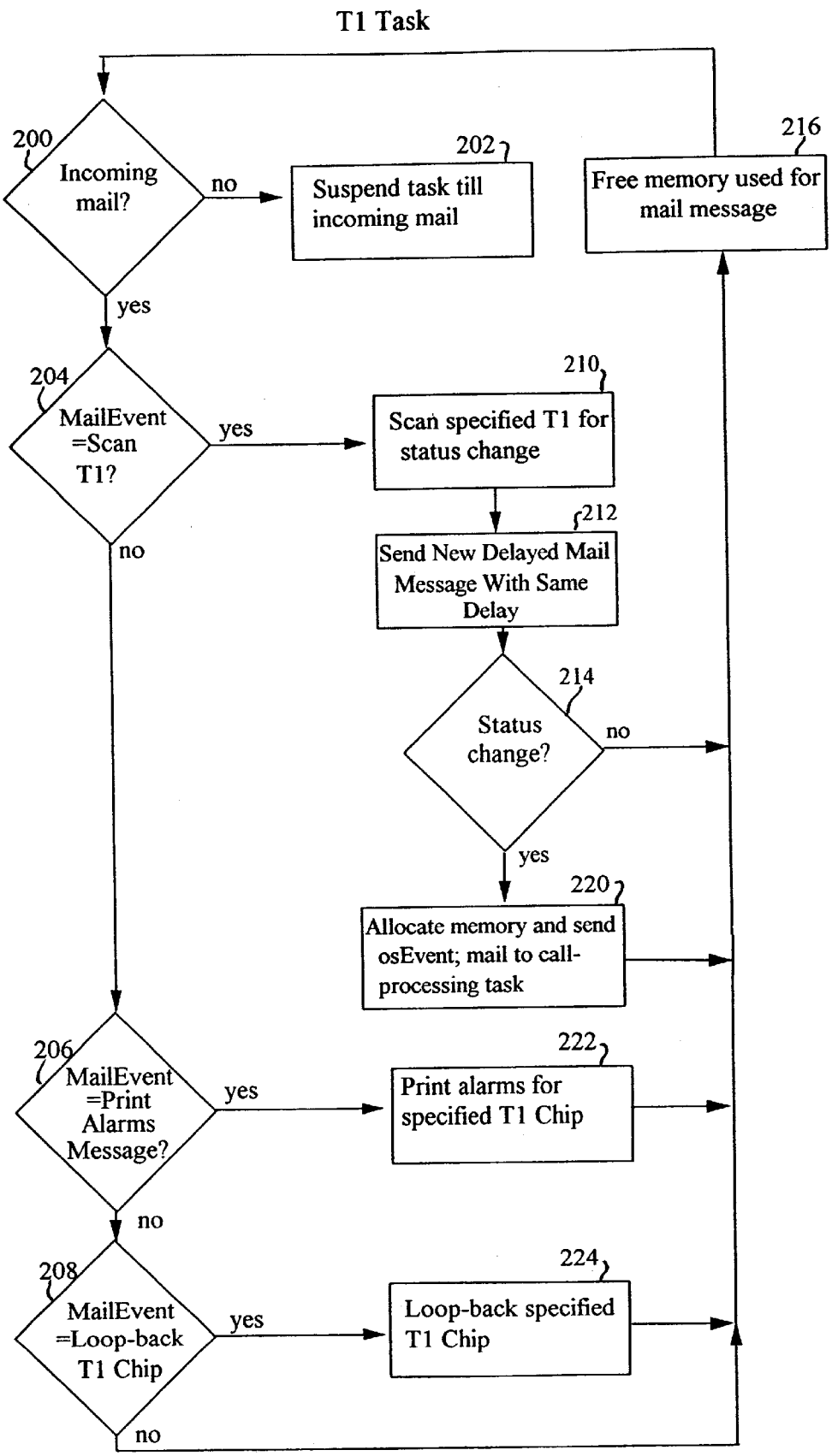
FIG. 7 shows a sample application task controlling the operation of the telephone switch hardware of the present invention.

FIG. 7 describes the typical flow for an application task that runs on a microprocessor on a circuit card. The particular task illustrated in FIG. 7 is the T1 task that runs on microprocessor 102 on T1 chip 14. The T1 task described in FIG. 7 provides various functions, including the scanning of channels on T1 connectors 70 and 72 for any change in status, such as an incoming phone call. It will be assumed for the purpose of this description that the T1 task shown in FIG. 7 comprises application task 50 in FIG. 2. This task includes an incoming mail queue 58 which receives mail messages 44 and 46 directed to the T1 task 50.

Referring to FIG. 7, the task is arranged in a loop that flows around the perimeter of the flow diagram. The program begins this loop at the top, flows down the left side, crosses over to the right side at a point depending on the mail received and then returns to the top of the loop. This flow around the loop occurs for each piece of mail received by the task.

The first step in this loop begins at decision block 200 where the task determines if there are any incoming mail messages in the incoming mail queue 58 that need to be processed. If not, the T1 task branches to block 202 and suspends its operation. The task remains suspended by the operating system until the T1 task receives mail. It then processes each piece of mail until it ends again at block 202.

Assuming that the task has mail, flow will continue downward in the flowchart to block 204. It will be noted that an application task is only activated by the operating system when the operating system places mail into the incoming mail queue of the task, so there will always be at least one loop through the task. Each piece of mail includes control information telling the task what function should be performed. The boxes 204, 206, 208 on the left side of FIG. 7 correspond to the functions that the application task can perform and to the functions that may be requested in the control information of a mail message sent to the task. It should be understood, however, that FIG. 7 does not show all the functions that an actual application task might perform.

For each piece of mail, flow proceeds downward through the boxes 204, 206 and 208 until the function that the mail is requesting the T1 task to perform is identified. The boxes 210, 222, 224 in the central region of the flow loop are where the requested function is actually performed. By way of example, block 206 detects all mail messages that ask the T1 task to print alarms. The function of printing the alarms is completed in block 222. The system then loops back to the top through block 216. Block 216 is used to free memory up that was used by the original incoming mail message.

If the message is not a request for the alarms to be printed, then flow proceeds to block 208. Block 208 detects all mail messages that ask the T1 task to perform a loopback function. The loopback function is completed in block 224 and the flow returns to block 216 to free the memory used by the mail message. The task then returns to block 200 and proceeds to block 202, providing this is the last mail message in the incoming queue for the T1 task. If other messages remain in the incoming queue, the function they ask to be performed will be identified in one of the blocks (204, 206, 208) in the main loop, and the function will be performed.

The two functions identified in blocks 222 and 224 are typical nonrepeating functions that may be requested by another task that may be running on another microprocessor located on another circuit card.

A principal function of the T1 task, however, is a repeating function which includes scanning the T1 channels for any status change. Mail messages carrying control information that request this function are identified in block 204, and that function begins in block 210. After the mail is identified as a Scan T1 function message, the T1 task tells itself to perform the task again at the desired repeating interval. This is accomplished in block 212 where the T1 task sends a message to the T1 task (itself) specifying the Scan T1 function in the control information of the mail message, and specifying a delay for the mail corresponding to the desired delay interval before the Scan T1 function is to be performed again.

In block 214, the results of the scan started in block 210 are identified. If there has been no change to the status of the T1 channels, the scan function ends by branching back to block 216, where the T1 task will flow to the end in block 202 (provided all mail has been processed). However, if the status has changed, program flow will proceed to block 220. The change in status generally requires that another task be informed of the status change so that it can be dealt with. For example, if an incoming call must be answered, another task will be required to perform this function. This task-to-task communication is also handled by mail, and block 220 allocates the memory for the necessary mail message, specifies the destination task and function to be performed and sends the appropriate mail message.

Block 200 and the blocks on the left side of FIG. 7 (204, 206 and 208) as well as the associated blocks 210, 22 and 224) that perform the associated functions comprise a mail receiving subtask. This subtask removes mail messages from the incoming mail queue and acts upon the control information specified in each mail message. Block 212 comprises a mail sending subtask for sending mail messages to the incoming mail queue of the mail task.

The flow seen in the T1 task of FIG. 7 is typical for each task. Each task analyzes its own incoming mail to identify the type of function to be performed. The task then performs the function, any mail that needs to be sent to other tasks or to itself is sent and the system loops back freeing the memory of the incoming mail message until all of the incoming mail has been processed. If a function needs to run repetitively, the task sends itself a new delayed mail message before it completes the specified function, as occurs in block 212.

Tasks may have many different functions, and the number of decision blocks like 204, 206 and 208 will be expanded accordingly. Those familiar with programming in this field will recognize that these decision blocks can easily be constructed in a SWITCH statement in the programming language used to implement the program flow diagram.

Because the many tasks that can be run have different priorities, each task is assigned its own priority. The operating system of the microprocessor can interrupt he processing of a low priority task to complete a higher priority task, before returning to a low priority task.

Figure 8:
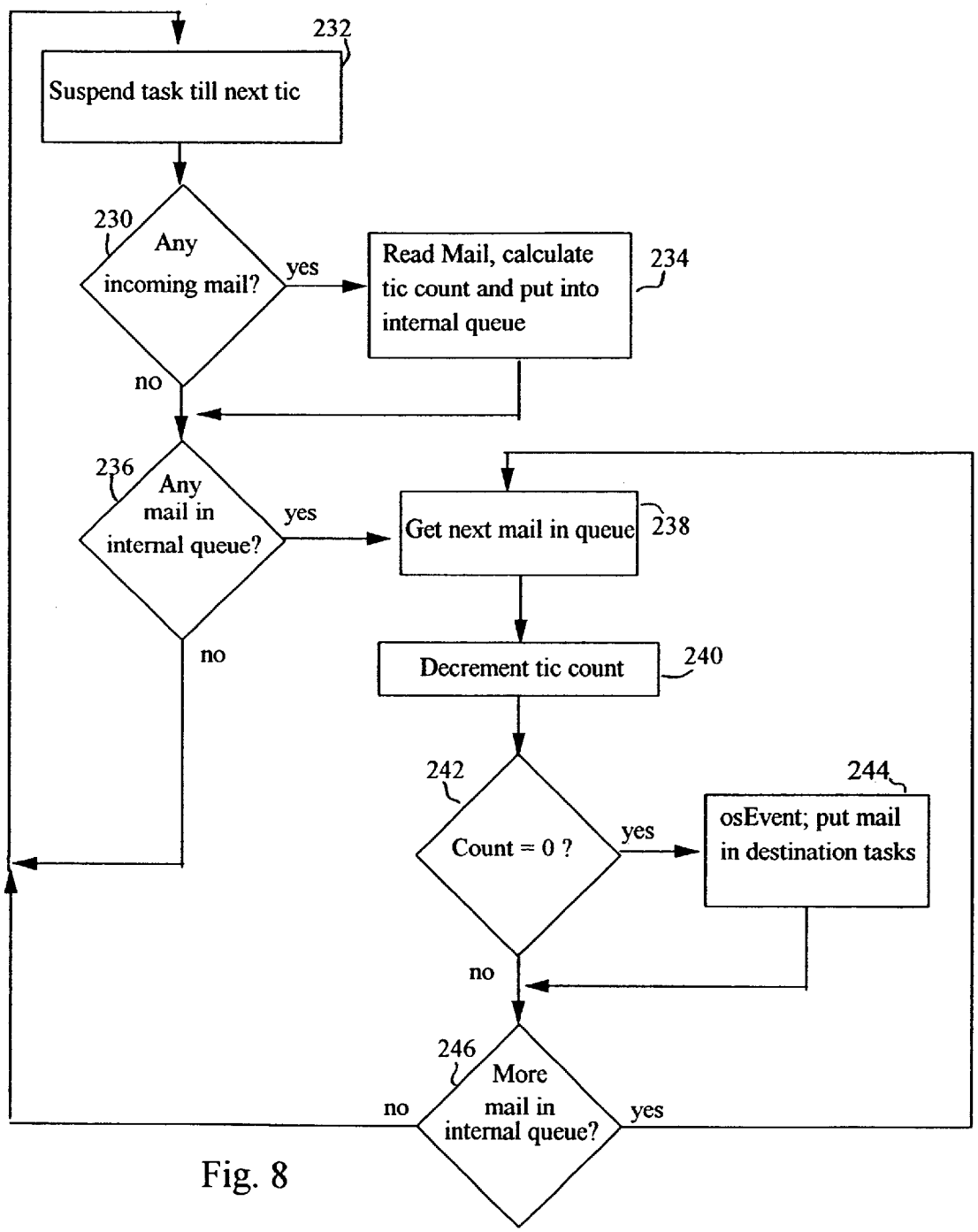
FIG. 8 shows a mail task in flow diagram form for handling the delayed mail of the present invention.

FIG. 8 provides a flow diagram of the mail task which operates in accordance with the present invention to handle delayed mail to control the described telephone switch. The mail task runs on the supervisor card's microprocessor and receives delayed mail, such as the delayed mail sent by the T1 task to itself in block 212.

The mail task begins at block 230 and ends at block 232. The majority of tasks, including the T1 task in FIG. 7, wake up when mail is placed into their incoming mail queue. The mail task, however, runs on a repeating basis according to a master countdown timer. Every time the master countdown timer reaches zero, the mail task runs and the operating system resets and restarts the timer for another countdown. The period of the master countdown timer is set very short and the mail task is given a high priority (higher than regular application tasks) so that the mail task repeats at least as often as the shortest delay needed by any task anywhere in the system. This allows a rapidly repeating task to repeat by sending itself delayed mail and insures that the mail task will handle that mail and send it back to the task's incoming mail queue on a timely basis.

Mail that is to be delayed, is sent to the mail task's incoming mail queue and identified in block 230. The incoming mail is then processed in block 234 and moved into an internal delayed mail queue. Blocks 230 and 234 comprise a mail receiving subtask for removing messages from the incoming mail queue and placing them into an internal delayed mail queue where they are held for a specified delay time.

In the preferred design, mail to be delayed carries a specified delay period in units of time. The sending task determines the delay it wants before the specified function in the mail is to be run. Block 234 converts the specified delay time of the message into a tic count by dividing the time period of the master countdown timer into the time period of the specified delay. The delayed mail is then placed into the delayed mail internal queue along with the calculated tic count.

This design allows the mail task to decrement the tic count of each piece of mail it is holding each time the mail task runs. Since the mail task repeats once every "tic", i.e., once every time the master countdown timer ends, the mail task can tell when to send delayed mail by watching the tic count of each piece of mail. Every time the mail task runs, each piece of mail has its tic count decremented, and when the associated tic count for a piece of mail reaches zero the mail is sent to its destination task.

Referring again to FIG. 8, each piece of mail in the incoming queue will be processed and moved into the internal delayed mail queue by the repetitive action of blocks 230 and 234. Once all the mail that has arrived has been processed, flow proceeds to block 236 to determine if there is any mail in the internal delayed mail queue. This queue contains all the delayed mail the mail task is holding, i.e., all the mail where the associated tic count has not yet been reduced to zero.

Generally there will be mail in this queue and flow will proceed to block 238. In block 238, the next item in the internal delayed mail queue will be selected and in block 240 the tic count of the next piece of mail being held will be decremented by 1. Decision block 242 determines whether the tic count has reached zero for that particular item of delayed mail. If the count has reached zero, then the mail tasks knows that the delayed mail should be sent to its specified destination task. This occurs in block 244 where the operating system is notified in an osEvent to place the mail into the incoming mail queue of the specified destination task.

In block 246, the internal delayed mail queue is checked to determine if there is any additional mail in the internal delayed mail queue that needs to be processed. Cycling continues from block 246 to block 238 etc. until all items of mail have their tic count decremented by one and all items with a tic count of zero have been sent to their specified destination task.

Blocks 238, 240, 242, 244 and 246 comprise a mail sending subtask. This subtask removes delayed mail messages from the internal delayed mail queue after the specified delay time and sends each delayed mail message to the destination application task specified in the mail message.

After all mail in the internal queue has been processed, flow proceeds to block 232 where the mail task ends. The mail task then waits for the next tic, i.e., the expiration of the master countdown timer. The completion of that timer generates an osEvent for the operating system which restarts the mail task for the next tic cycle.

Figure 9:
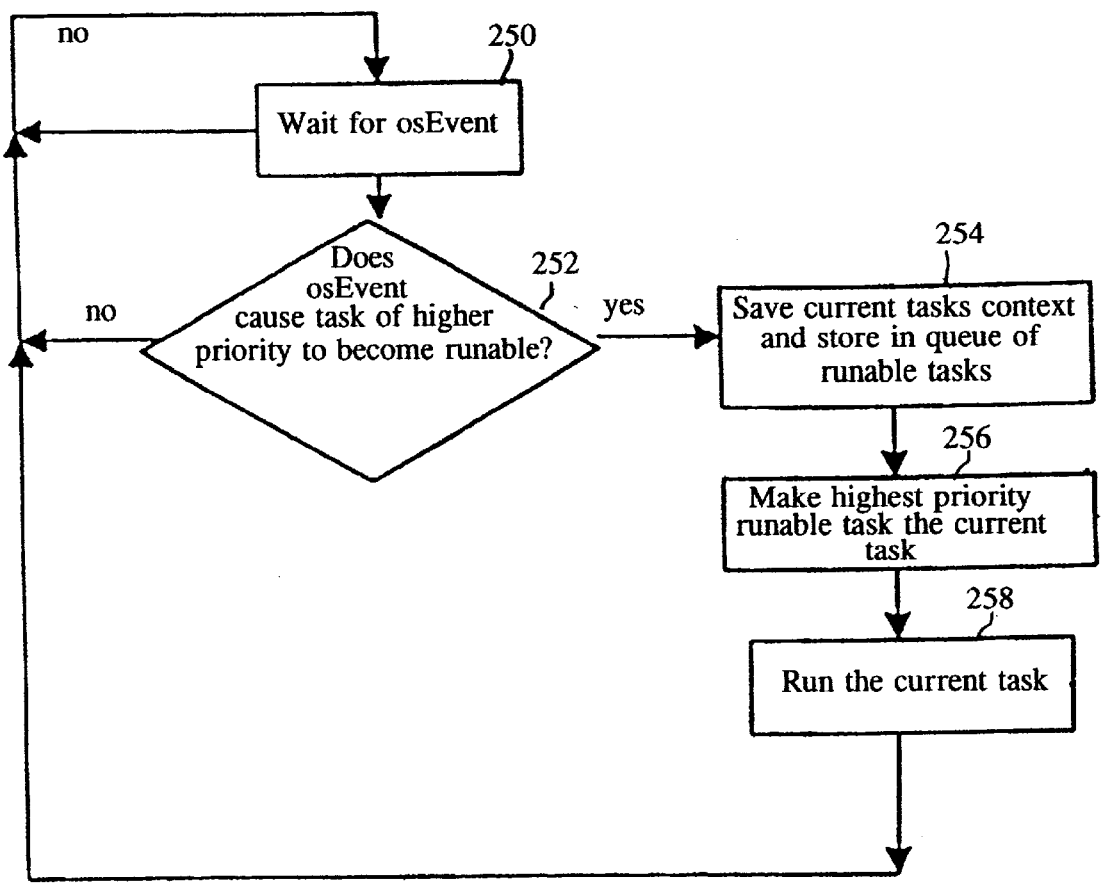
FIG. 9 shows a simplified flow diagram of the operating system running on the microprocessor of each circuit card.

FIG. 9 provides a simplified flow diagram for a conventional operating system as used in this invention. The operating system is waiting for an event to occur in block 250. A typical event might be the expiration of the master countdown timer for the mail task, or the sending of mail by a task. The sending of mail into the incoming mail queue of a task causes the operating system to start the task.

The operating system determines the priority of the task that it is currently running and compares it to the priority of any new task to be run as a result of the osEvent in block 252. If a higher priority task is to be run, flow proceeds to block 254 where the current task of lower priority is saved in a queue, the higher priority task is made the current task in block 256 and the operating system begins to run the high priority task in block 258.

For example, the mail task is a high priority task. If another task is running, and the master countdown timer ends, and osEvent is generated. The operating system will determine that the high priority mail task needs to run, and will stop any lower priority tasks and begin to run the mail task. In the conventional manner, the operating system will run the highest priority task until it is complete, and then pick up the next higher priority task from the task queue.

Figure 10:
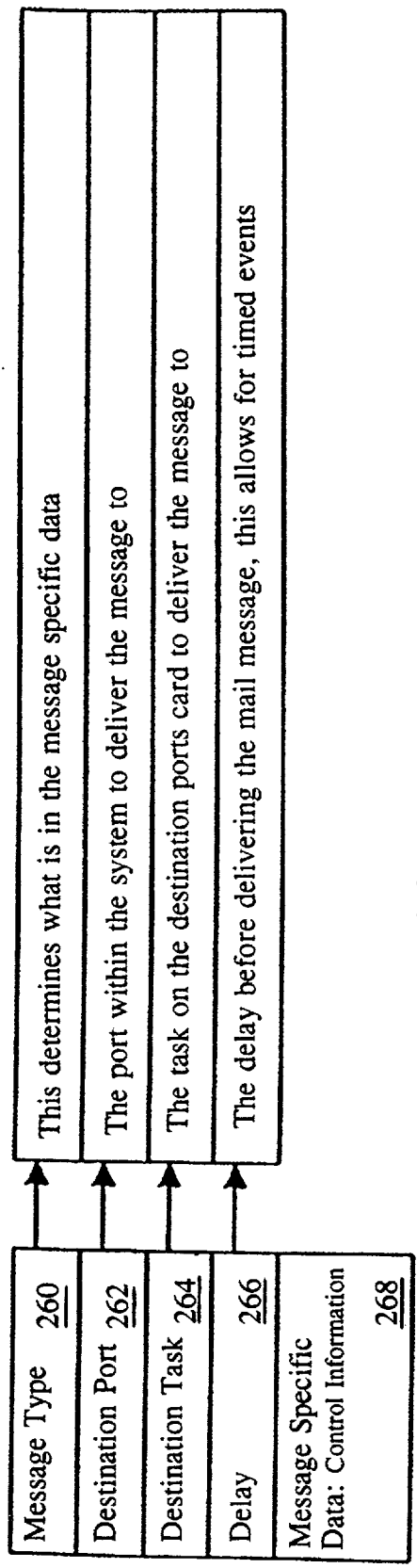
FIG. 10 shows a typical delayed mail message of the present invention.

FIG. 10 provides a sample structure for a typical delayed mail message. The delayed mail message includes a message type 260 that determines what is in the message, a destination port 262 corresponding to a channel in a digital data stream so that the message can be sent to the appropriate location, a destination task 264 identifying the application task that is to receive the message, a specified delay 266 which allows for timed events and additional control information 268 which is used by the destination task to perform its function.

As can be seen from the above description, the present invention lends itself to distributed processing wherein multiple microprocessors located on the separate circuit cards communicate with each other through the mail system. The tasks may be organized in various ways and provided with different functions to suit the specific telephone switch design.

In the present invention it is preferred for the supervisor card to include a task that communicates with the various circuit cards and a server task that communicates with the server. The T1 card includes a call processing task, a tone task and a T1 task of the type described. The call processing task contains a state machine that identifies the state of each telephone call. The tone task controls the digital signal processor responsible for gain adjustment, tone injection and tone detection.

It will be understood that the complexity of a telephone switch calls for numerous functions to be performed by the various tasks. The delayed mail control system described in connection with this invention allows a very flexible and responsive design that may be expanded to multiple cards with multiple processors. The addition of extra cards, such as the compression card 16 and the data card 18 is handled quite easily. Each card contains its own microprocessor and that microprocessor runs tasks that send and receive mail to interact with the other tasks in the described manner.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A telephone switch comprising:
    at least one microprocessor adapted for running programming tasks;
    a mail task running at sequentially spaced time intervals on the at least one microprocessor and including:
        an incoming mail queue for receiving mail messages to be held by the mail task,
        an internal delayed mail queue for holding received mail messages for a delay time specified in each mail message;
        a mail receiving subtask for removing messages from the incoming mail queue and placing them in the internal delayed mail queue, and
        a mail sending subtask for removing delayed mail messages from the internal delayed mail queue after the specified delay time and sending each delayed mail message to a destination application task specified in the mail message; and
    a plurality of application tasks for controlling the operation of the telephone switch, each application task having:
        an incoming mail queue for receiving mail messages directed to control the application task,
        a mail receiving subtask for removing mail messages from the incoming mail queue and acting upon control information specified in each mail message, and
        a mail sending subtask for sending mail messages to the incoming mail queue of the mail task;
    each mail message sent to the mail task including a specified destination application task, control information, and a specified delay time.

2. The telephone switch according to claim 1 wherein at least one of the plurality of application tasks is a repeating task that performs a repeating function and the repeating task repeats the function at a desired time interval by sending a delayed mail message to the mail task each time the repeating function is run by the repeating task, the mail message including the repeating task in the mail message as the specified destination task, the desired time interval as the specified delay time and the function to be repeated as the control information.

3. The telephone switch according to claim 1 including at least two microprocessors adapted for running programming tasks, the mail task being run on a first one of the at least two microprocessors and at least one of the plurality of application tasks being run on a second one of the at least two microprocessors.

4. The telephone switch according to claim 3 further including at least two separate circuit cards corresponding to the at least two microprocessors, and the at least two microprocessors are located on their corresponding separate circuit cards.

5. The telephone switch according to claim 4 further including a backplane having a plurality of stream buses for carrying digital data, the circuit cards being connected to the backplane and interconnected via the plurality of stream buses.

6. The telephone switch according to claim 5 wherein the backplane includes a control stream bus for carrying a digital data control stream organized into channels, the channels corresponding to the circuit cards connected to the backplane.

7. The telephone switch according to claim 5 wherein the plurality of stream buses carry digital voice data to be switched.

8. The telephone switch according to claim 1 wherein the at least one microprocessor includes a master countdown timer, the at least one microprocessor running the mail task and resetting and restarting the countdown timer each time the master countdown timer counts down to run the mail task at the sequentially spaced time intervals.

9. The telephone switch according to claim 1 wherein the mail receiving subtask divides the specified delay time by the time interval of the sequentially spaced time intervals for the mail task to determine a tic count for each delayed mail message, and the mail sending subtask decrements the tic count for each delayed mail message each time the mail task runs to determine when to send each delayed mail message to its destination application task.

10. The telephone switch according to claim 1 wherein each application task includes an associated priority, the telephone switch running application tasks having higher priority before application tasks having lower priority.

11. A method of controlling a telephone switch comprising the steps of:

running a mail task on the telephone switch, the mail task including an internal delayed mail queue for holding received mail messages for a delay time specified in each mail message;

running a plurality of application tasks on the telephone switch to control the telephone switch;

sending delayed mail messages from application tasks to the mail task, the delayed mail messages including a destination application task, a specified delay time and control information to control the destination application task;

holding the delayed mail messages in the internal delayed mail queue for the specified delay time; and sending each delayed mail message from the mail task to the corresponding destination application task after the specified delay time for each delayed mail message has elapsed.

12. The method of claim 11 further including the steps of:

prioritizing the application tasks; and running higher priority application tasks before lower priority application tasks.

13. The method of claim 11 wherein the telephone switch includes a plurality of microprocessors and the step of running a mail task comprises running the mail task on a first one of the microprocessors and the step of running a plurality of application tasks comprises running at least one of the application tasks on a second one of the microprocessors.

14. The method of claim 11 wherein the step of running a mail task on the telephone switch comprises running the mail task at regularly repeating time intervals.

15. The method of claim 14 wherein:

the step of running a mail task on the telephone switch includes the steps of:

receiving delayed mail messages;

placing received mail messages in the internal delayed mail queue, calculating a tic count for each mail message by dividing the time interval of the mail task into the specified delay time for each mail message; and decrementing the tic count for each mail message each time the mail task runs;

the step of holding the delayed mail messages comprises holding delayed mail messages where the tic count is not yet zero; and the step of sending each delayed mail message comprises sending each delayed mail message when the tic count reaches zero.

16. The method of claim 11 wherein the step of sending each delayed mail message from the mail task to the corresponding destination application task includes the step of placing the delayed mail message into an incoming mail queue for the corresponding destination application task.

17. The method of claim 11 further including the steps of:

analyzing each delayed mail message received by a destination application task to determine the control information specified in the message; and performing a function corresponding to the control information specified in each delayed mail message.

18. The method of claim 17 wherein the step of analyzing each delayed mail message received by a destination application task includes the step of sequentially comparing the control information specified in each delayed mail message to functions on a list of functions the destination application task can perform.

19. The method of claim 17 wherein the step of sending delayed mail messages from application tasks to the mail task includes the step of allocating memory for the mail message by the application task sending the message and the method further includes the step of freeing the memory allocated for the mail message after the step of analyzing the delayed mail message.

* * * * *